United States Patent [19]
Ganot

[11] Patent Number: 5,788,325
[45] Date of Patent: Aug. 4, 1998

[54] LOCKING MECHANISM FOR A VEHICLE SEAT, AND A SEAT INCLUDING SUCH A MECHANISM

[75] Inventor: Denis Ganot, Flers, France

[73] Assignee: Bertrand Faure Equipements S.A., Boulogne, France

[21] Appl. No.: 784,379

[22] Filed: Jan. 17, 1997

[30] Foreign Application Priority Data

Jan. 22, 1996 [FR] France .................... 96 00660

[51] Int. Cl.⁶ .................................. B60N 2/42
[52] U.S. Cl. .................. 297/216.14; 297/378.11; 297/367
[58] Field of Search .................. 297/378.4, 367, 297/216.14, 216.13, 216.15, 216.1

[56] References Cited

U.S. PATENT DOCUMENTS

| | | |
|---|---|---|
| 4,143,905 | 3/1979 | Hensel et al. . |
| 4,225,177 | 9/1980 | Kluting .................... 297/378.11 |
| 4,438,974 | 3/1984 | Kresky et al. ............ 297/378.11 |
| 4,634,182 | 1/1987 | Tanaka .................... 297/378.11 |
| 4,743,067 | 5/1988 | Pipon et al. ............. 297/378.11 |
| 5,163,736 | 11/1992 | Aljundi . |
| 5,216,936 | 6/1993 | Baloche . |

FOREIGN PATENT DOCUMENTS

| | | |
|---|---|---|
| 0 505 229 A1 | 9/1992 | European Pat. Off. . |
| 0 691 238 A1 | 6/1995 | European Pat. Off. . |
| 0 691 238 | 10/1997 | European Pat. Off. . |
| 2 565 801 | 12/1985 | France . |
| 44 41 159 A1 | 5/1995 | Germany . |
| 2 284 753 | 6/1995 | United Kingdom . |

*Primary Examiner*—Peter M. Cuomo
*Assistant Examiner*—Anthony D. Barfield
*Attorney, Agent, or Firm*—Larson & Taylor

[57] ABSTRACT

A vehicle seat hinge has a fixed first cheek plate, a moving second cheek plate provided with an inwardly-directed circular set of teeth, and at least one slug suitable for co-operating with the teeth of the moving cheek plate, said slug being radially displaceable by means of a cam which is controlled by an actuator device to lock the hinge in the event of the vehicle being subjected to a predetermined level of impact.

15 Claims, 5 Drawing Sheets

LOCKING MECHANISM FOR A VEHICLE SEAT, AND A SEAT INCLUDING SUCH A MECHANISM

FIELD OF THE INVENTION

The present invention relates to locking mechanisms for vehicle seats, in particular car seats, and also to vehicle seats fitted with such mechanisms.

More particularly, the invention relates to locking mechanisms for fitting to vehicle seats, each comprising a seat proper and a seat back pivotally mounted relative to the seat proper about a transverse pivot axis, the mechanism comprising:

- first and second cheek plates, one for securing to the seat proper and the other for securing to the seat back, which cheek plates are pivotally mounted relative to each other about the pivot axis;
- locking means for locking the first and second cheek plates relative to each other; and
- actuator means responsive at least to a predetermined front or back impact to which the vehicle may be subject, said actuator means being provided to lock the first and second cheek plates relative to each other via the locking means in the event of the above-mentioned predetermined impact occurring.

BACKGROUND OF THE INVENTION

Locking mechanisms of the kind in question are additional to and reinforce the hinge mechanisms that are usually provided to adjust the inclination of the seat back, thereby providing additional strength in the event of the vehicle suffering front or back impact.

Document FR-A-2 565 801 describes an example of such a locking mechanism.

The locking mechanism described in that document is designed not only to lock two cheek plates relative to each other when the vehicle is subjected to predetermined impact, but also to absorb a portion of the mechanical energy of the impact, thereby causing the locking mechanism to be relatively complex and expensive.

OBJECTS AND SUMMARY OF THE INVENTION

A particular object of the present invention is to mitigate those drawbacks.

To this end, according to the invention, in a locking mechanism of the kind in question the locking means comprise:

- a set of teeth secured to the second cheek plate, said set of teeth extending over at least an arc of a circle centered on the pivot axis and being directed radially inwards;
- at least one slug provided with an outwardly-directed set of teeth suitable for co-operating with the set of teeth of the second cheek plate, said slug being guided by a guide secured to the first cheek plate to slide in a radial direction between an engaged position in which the slug co-operates with the set of teeth of the second cheek plate to lock the hinge and a retracted position in which it does not co-operate with the teeth of the second cheek plate; and
- a locking cam which controls sliding of the slug and which is itself controlled by said actuator means, the locking cam normally being in a rest position where it

2 enables the slug to slide towards its retracted position, and the actuator means being provided to displace the locking cam into a locking position in which it places the slug in its engaged position in the event of the above-mentioned predetermined impact occurring.

The slug and teeth system used by this locking mechanism is similar to the slug and teeth system used in certain widely-distributed seat hinge mechanisms that enable the user to release the seat back for pivoting purposes in order to adjust the inclination thereof.

Consequently, not only is the locking mechanism of the invention of a design that is simple and well-mastered, but it is also capable, where appropriate, of being manufactured at least in part by using the same tooling as that already in use for manufacturing the above-mentioned hinge mechanisms, thereby further helping to reduce costs.

In preferred embodiments, use is also made of one or more of the following dispositions:

- in the absence of the above-mentioned predetermined impact, the locking cam is held in its rest position by resilient means;
- the locking cam is mounted to rotate about the pivot axis, said locking cam having first and second camming surfaces suitable for co-operating with the slug in the event of the locking cam being displaced angularly in either direction from its rest position, so as to place said slug in its engaged position;
- the locking cam is mounted to rotate about the pivot axis, the resilient means which hold said locking cam in its rest position including a resilient metal wire which extends between two ends fixed to said locking cam respectively on either side of the slug, said resilient metal wire having a central portion which bears radially inwards on a projecting portion of the slug, holding said slug in its retracted position so long as the locking cam is in its rest position;
- the mechanism also constitutes a hinge mechanism for adjusting the inclination of the seat back and further includes:
  - an "adjustment" cam for controlling sliding of the slug, said adjustment cam being held by resilient means in a rest position where it puts the slug in its engaged position; and
  - a control member for moving the adjustment cam from its rest position to an actuated position in which it enables the slug to slide towards its retracted position; these dispositions are particularly advantageous in that they make it possible to integrate a seat back inclination-adjustment mechanism in the same assembly as the locking mechanism, the slug and the corresponding inwardly-directed teeth serving both to lock the back in the event of impact and, in the absence of impact, to hold the seat in the position set by the user;
- the locking and adjustment cams are mounted to rotate independently of each other about the pivot axis in two adjacent planes, the slug including both a main body situated in the same plane as the adjustment cam and including the outwardly-directed teeth of the slug, and a projecting portion situated in the plane of the locking cam and co-operating with said locking cam;
- the resilient means which hold the locking cam in its rest position include a resilient metal wire which extends between two ends fixed to said locking cam respectively on either side of the projecting portion of the slug, said resilient metal wire having a central portion which bears radially inwards on the projecting portion of the slug, urging said slug towards its retracted position with a force that is lower than the urging applied to said slug under the effect of the resilient means that act on the adjustment cam;

the central portion of the resilient metal wire includes a projecting portion which projects radially outwards and which is engaged radially against the projecting portion of the slug, lying over a portion of the outline of said projecting portion of the slug;

the slug has two opposite abutment faces extending from the vicinity of the teeth of said slug to a shoulder disposed facing away from the teeth of the slug and situated close to said teeth, at least the abutment faces of the slug presenting high strength, the guide including two counter-abutment faces respectively disposed facing the two abutment faces and their shoulders and having strength lower than the strength of the abutment faces, and when the slug is in its engaged position, the facing abutment and counter-abutment faces are in mutual contact over an area that is small enough for one of the abutment faces then to penetrate into the corresponding counter-abutment face of the guide when one of the cheek plates is subjected to pivoting torque about the axis of rotation exceeding a predetermined minimum torque; and the predetermined minimum torque lies in the range 50 mdaN and 200 mdaN.

The invention also provides a vehicle seat comprising a seat proper and a seat back that is pivotal relative to the seat proper about a transverse pivot axis, the seat being fitted with a locking mechanism as defined above.

In preferred embodiments of the seat, use is also made of one or more of the following dispositions:

the locking cam is mounted to rotate relative to the pivot axis, the means for actuating said locking cam including a fly weight which is connected to said second cam via a lever arm and which is offset vertically relative to the pivot axis;

the means for actuating the locking cam comprise a pyrotechnic device which, in the event of said predetermined impact, is suitable for displacing very quickly an actuator member connected to the locking cam in order to place said locking cam in its locking position; and the means for actuating the locking cam comprise a flexible link extending transversely inside the seat back between a fixed first end and a moving second end connected to said locking cam, said flexible link being organized to be subjected to tension in the event of an occupant of the seat being pressed into said seat back, said flexible link then urging the locking cam towards its locking position.

BRIEF DESCRIPTION OF THE DRAWINGS

Other characteristics and advantages of the invention appear from the following detailed description of various embodiments thereof, given as non-limiting examples and with reference to the accompanying drawings.

In the drawings.

In the various figures, the same references designate items that are identical or similar.

MORE DETAILED DESCRIPTION

Figure 1:
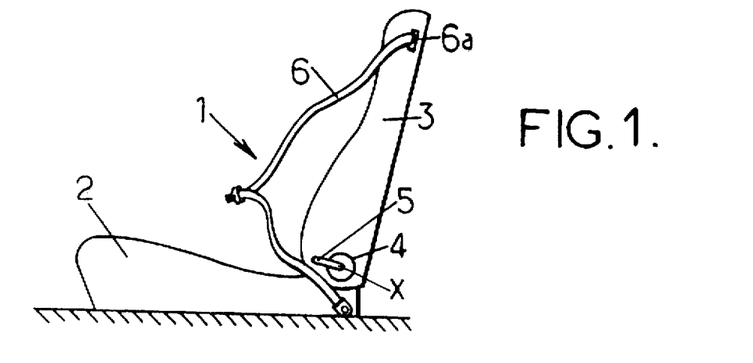
FIG. 1 is a diagrammatic view of a vehicle seat fitted with a locking mechanism constituting a first embodiment of the invention.
Figure 2:
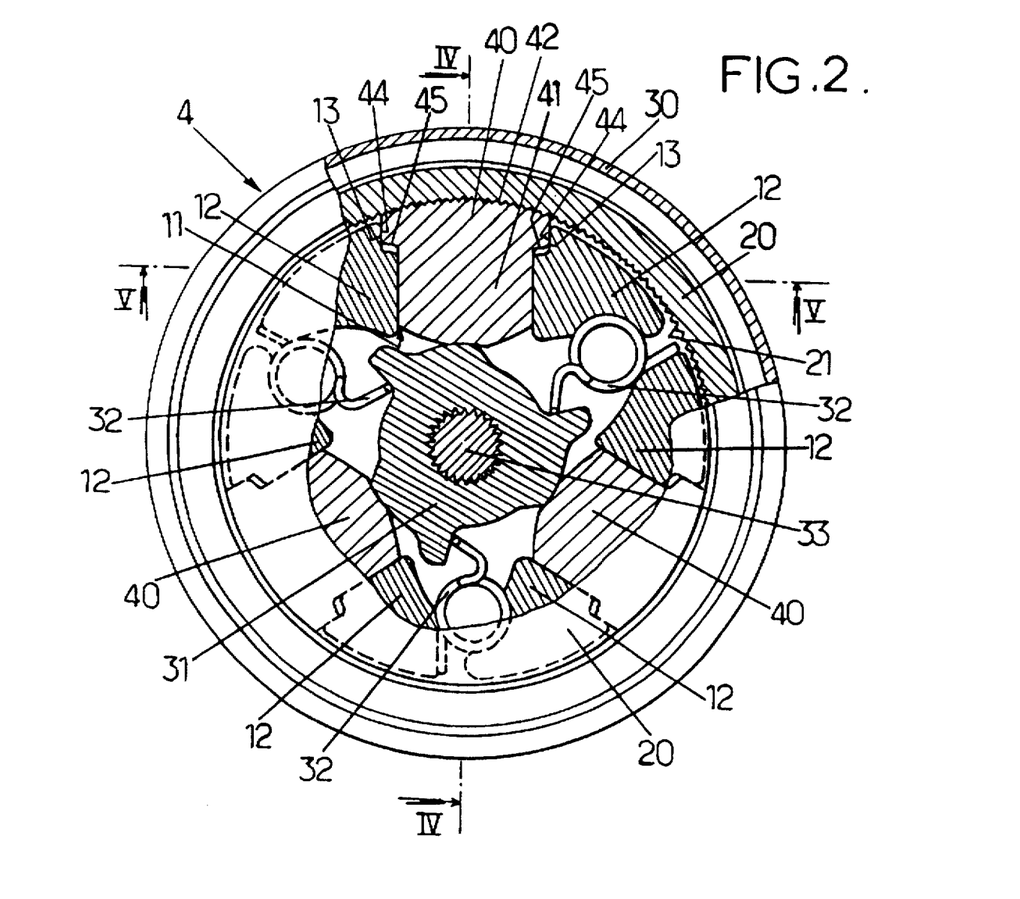
FIG. 2 is a fragmentary section through the locking mechanism fitted to the seat of FIG. 1, the section being taken on a radial plane on line II—II of FIG. 4.

FIG. 1 shows a vehicle seat 1, in particular a front seat of a car. The seat comprises a seat proper 2 and a seat back 3 that is pivotally mounted relative to the seat proper 2 about a transverse axis X via a hinge mechanism 4 which enables the inclination of the seat back to be adjusted and which locks in the event of the vehicle being subject to impact.

When a user of the seat 1 seeks to adjust the inclination of the seat back 3, the user actuates a handle 5 or other control member to release the hinge 4, thereby allowing the desired inclination to be adjusted by acting directly on the seat back 3, after which the user releases the handle 5, thereby locking the hinge 4 again.

The seat may optionally include a similar hinge 4 on each side, both hinges then preferably being controlled by a single handle 5.

Optionally, the seat 1 may also include a seat-mounted safety belt 6 mechanically connected to the top portion of the seat back 3. This mechanical connection generally consists in a sliding mount for the belt 6 through an opening 6a formed on one side of the seat back 3, with the belt 6 extending beyond said opening 6a inside the seat back 3 to a winder (not shown).

The hinge 4 is shown in detail in FIGS. 2 to 5.

In conventional manner, the hinge comprises the following (see a similar mechanism in document FR-A-2 578 602):

a "fixed" metal cheek plate 10 secured to the framework 2a of the seat proper 2 of the seat;

a "moving" metal cheek plate 20 secured to the framework 3a of the seat back 3 and pivoted about the axis of rotation X of said seat back, the fixed and moving cheek plates together forming a round box, and the moving cheek plate 20 including a circular set of teeth 21 directed radially inwards and disposed inside the box;

a sheet metal ring 30 crimped to the periphery of the fixed cheek plate 10 and partially overlying the moving cheek plate 20 to close the box and keep the two cheek plates pressed against each other;

three metal slugs 40 disposed inside the box, each comprising a main body 41 provided with an outwardly-directed set of teeth 42 suitable for co-operating with the inwardly-directed teeth 21 of the moving cheek plate 20, the three slugs being guided to slide in radial directions along guide grooves 11 formed between projections 12 belonging to the fixed cheek plate and projecting into the inside of the box;

a first cam 31 that is rotatable about the axis X, said cam 31 being a metal plate lying in the same radial plane as the slugs 40, the first cam 31 being angularly displaceable between a rest position in which it urges the slugs outwards towards an engaged position in which the outwardly-directed teeth 42 of the slugs co-operate with the inwardly-directed teeth 21 of the moving cheek plate to lock said moving cheek plate in position, and an actuated position in which said first cam enables the slugs to reverse towards a retracted position in which their outwardly-directed teeth no longer co-operate with the inwardly-directed teeth of the moving cheek plate;

three metal springs 32 urging the first cam towards its rest position; and a shaft 33 connected to the handle 5, said shaft extending longitudinally along the X axis and being secured to the first cam 31.

Thus, when a user actuates the handle 5 causing the first cam to rotate to its actuated position, the slugs 40 are free to reverse towards their retracted position, thereby enabling the moving cheek plate 20 to rotate, and thus enabling the inclination of the seat back to be adjusted.

When the user releases the handle 5, the first cam returns to its rest position under drive from the springs 32, thereby returning the slugs 40 to their engaged positions. The slugs then prevent rotation of the moving cheek plate 20 and thus of the seat back 3.

According to the invention, the hinge 40 also includes a second cam 50 inside the box, lying in a radial plane close to the plane of the first cam 31.

This second cam is rotatable about the axis X independently of the first cam 31 and it co-operates with the projecting portions 43 of the slugs 40.

Figure 3:
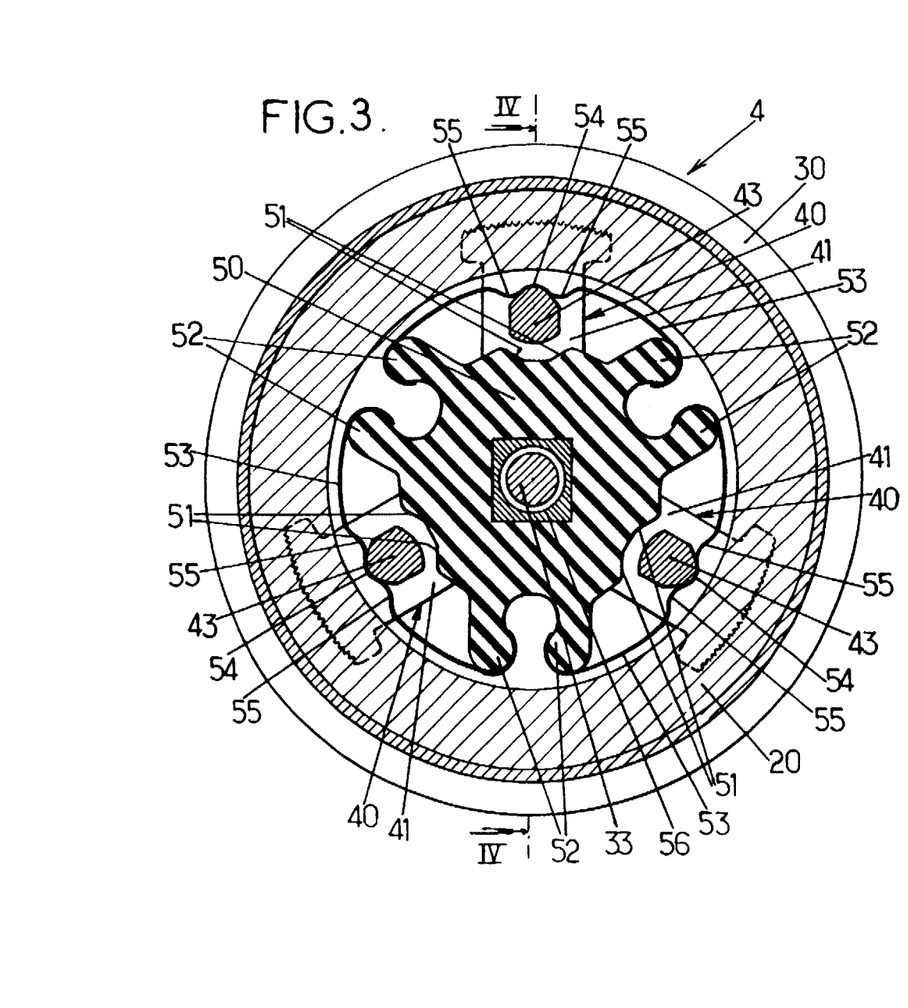
FIG. 3 is another section view of the FIG. 2 mechanism, the section being likewise in a radial plane, on line III—III of FIG. 4.

The second cam 50 is a metal plate comprising, relative to each projecting portion 43, two camming surfaces 51 suitable for urging said projecting portion radially outwards, placing the corresponding slug 40 in its engaged position when said second cam 50 is moved angularly in either direction from its rest position shown in FIG. 3.

Also, on either side of each slug 40, the second cam includes two fingers 52 which extend substantially radially outwards and which are fixed to the two ends of a resilient metal wire 53 that is clipped resiliently over the two fingers 52.

Each of the three resilient metal wires 53 extends substantially along a circular arc between its two ends, passing radially outside the projecting portion 43 of one of the slugs 40.

The central portion of the wire has a projection 54 that projects radially outwards and that follows a portion of the outline of the projecting portion 43 of the corresponding slug, bearing radially inwards on said projecting portion 43, the projection 54 being located between two projections 55 that project radially inwards.

Thus, the resilient metal wires tend to hold the second cam 50 resiliently in its rest position and they also urge the slugs 40 towards their retracted positions, with a force that is less than the force applied to said slugs 40 by the first cam 31 under the drive of the springs 32, when said first cam is in its rest position.

Figure 4:
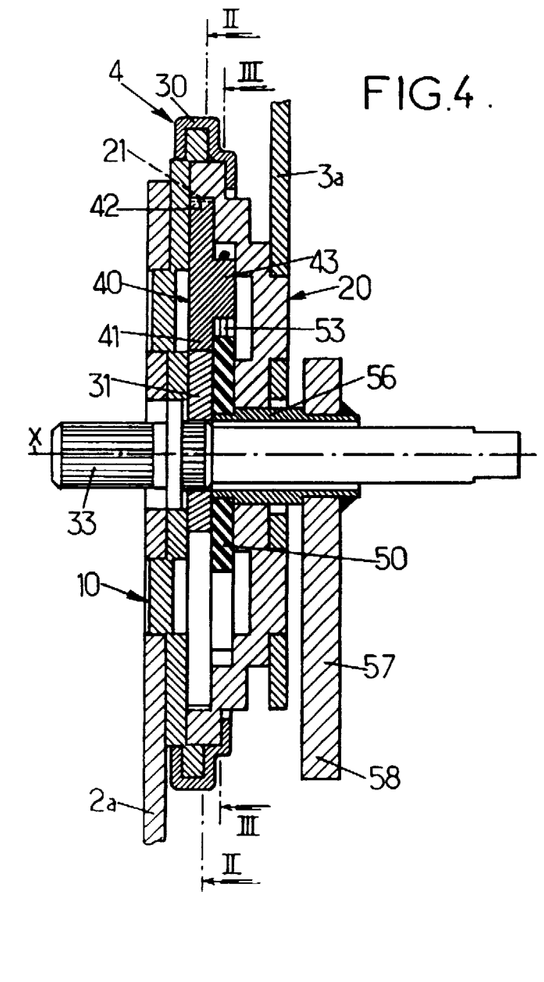
FIG. 4 is an axial section on line IV—IV in FIGS. 2 and 3.

Also, the second cam 50 is secured to a shaft 56 which, in the example shown, is hollow and surrounds the shaft 33.

The hollow shaft is itself secured to a lever arm 57 whose rotation is controlled by actuator means responsive to any front or back impact to which the vehicle may be subject.

Figures 5, 6, 7, 8:
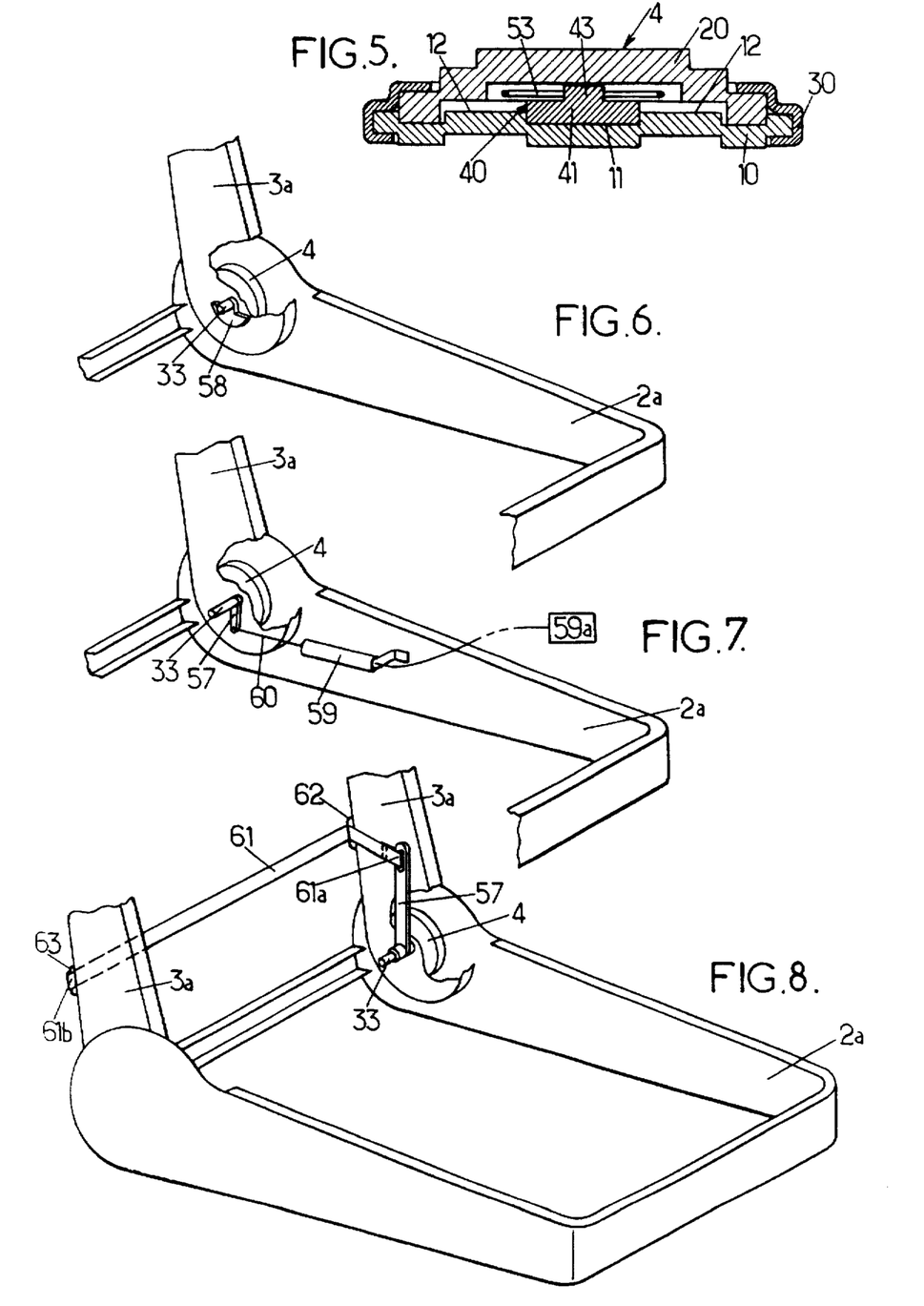
FIG. 5 is a section view on line V—V of FIG. 2.
FIGS. 6 to 8 are partially cutaway diagrammatic fragmentary perspective views showing three possible ways in which the mechanism of FIGS. 2 to 5 can be actuated.

As shown more clearly in FIG. 6, these actuator means may be constituted by a fly weight 58 fixed to the end of the lever arm 57, which lever arm 57 then preferably extends substantially vertically downwards from the hollow shaft 57 when the hinge is mounted on the seat.

Thus, when the vehicle is subject to sufficiently large front or back impact, the fly weight 58 rotates the lever 57 and the second cam 50, thereby ensuring that the projecting portions 43 of the various slugs are urged radially outwards, each being urged via a camming surface 51 of the second cam 50.

Consequently, if the occupant of the seat happens to be adjusting the inclination of the seat back at the moment the impact occurs, the second cam 50 returns the slugs 40 into the engaged position, thereby locking the hinge 4.

Also, even if the occupant of the seat is not adjusting the inclination of the seat back when the impact occurs, it will be observed that the second cam 50 contributes to preventing the slugs 40 disengaging from the set of teeth 21 at the moment of the impact.

The implementation of the invention shown in FIG. 7 differs from the embodiment shown in FIGS. 1 to 6 merely by the fact that the lever arm 57 no longer includes a fly weight 58, but is connected to a pyrotechnic device 59 via a cable or a rod 60, with the pyrotechnic device being secured to the framework 2a of the seat proper.

The pyrotechnic device 59 may be constituted, for example, by a pretensioner of the kind commonly used for tensioning the seat belt of a motor vehicle in the event of an impact. Documents FR-A-2 706 544 and FR-A-2 716 423 describe examples of such pretensioners that can be used in the context of the present invention.

The pyrotechnic device 59 is connected to an impact sensor 59a which, when the vehicle is subject to a sufficiently violent impact, in particular a front impact or a back impact, triggers firing of the said device 59, which then acts in a fraction of a second to exert a high level of traction on the cable 60, thereby locking the hinge 4 by rotating the lever arm 57 and the second cam 50.

Finally, the implementation of the invention shown in FIG. 8 differs from the embodiment of FIGS. 1 to 6 merely by the fact that the lever arm 57 extends upwards instead of extending downwards, and it does not include a fly weight 58, but is instead fixed to a moving end 61a of a strap 61.

Starting from its moving end 61a, the strap extends backwards to a deflector loop 62 secured to a first side upright of the framework 3a of the seat back, after which the strap 61 extends across the seat back substantially horizontally to a fixed end 61a secured to a fixing point 63 on the second lateral upright of the framework 3a of the seat back.

When the occupant of the seat presses against the back, and in particular when said occupant is tending to sink into the back under the effect of a back impact to which the vehicle is being subjected, the strap 61 is subject to traction, and as a result its moving end 61a to pull back the top end of the lever 57.

Consequently, when the vehicle is subjected to a sufficiently strong back impact, the strap 61 displaces the lever arm 57 angularly together with the cam 50, thereby locking the hinge 4.

Figure 9:
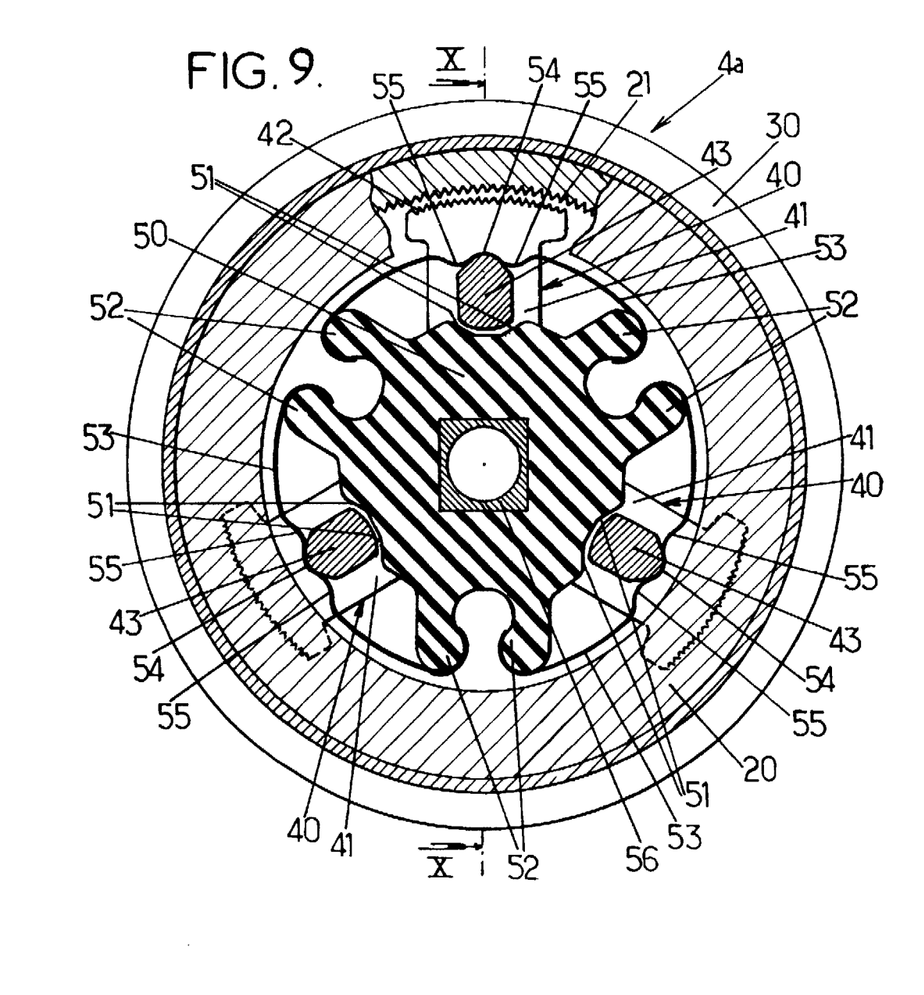
FIG. 9 is a section view through a locking mechanism constituting a second embodiment of the invention, the section being on line IX—IX of FIG. 10 and the figure is partially cutaway over one of the slugs.
Figure 10:
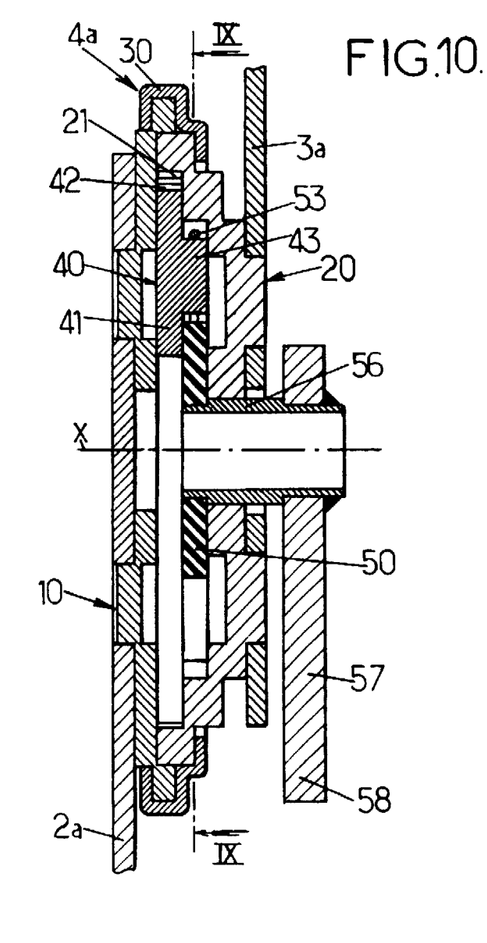
FIG. 10 is a section view on line X—X of FIG. 9.

The mechanism 4a shown in FIGS. 9 and 10 is intended solely to provide additional strength for retaining the seat back 3 in the event of the vehicle being subjected to a front or back impact of sufficient magnitude.

The locking mechanism 4a is thus still associated with a hinge mechanism 70 (see FIG. 13) that enables the inclination of the seat back 3 to be adjusted relative to the seat proper 2.

Figures 11, 12, 13:
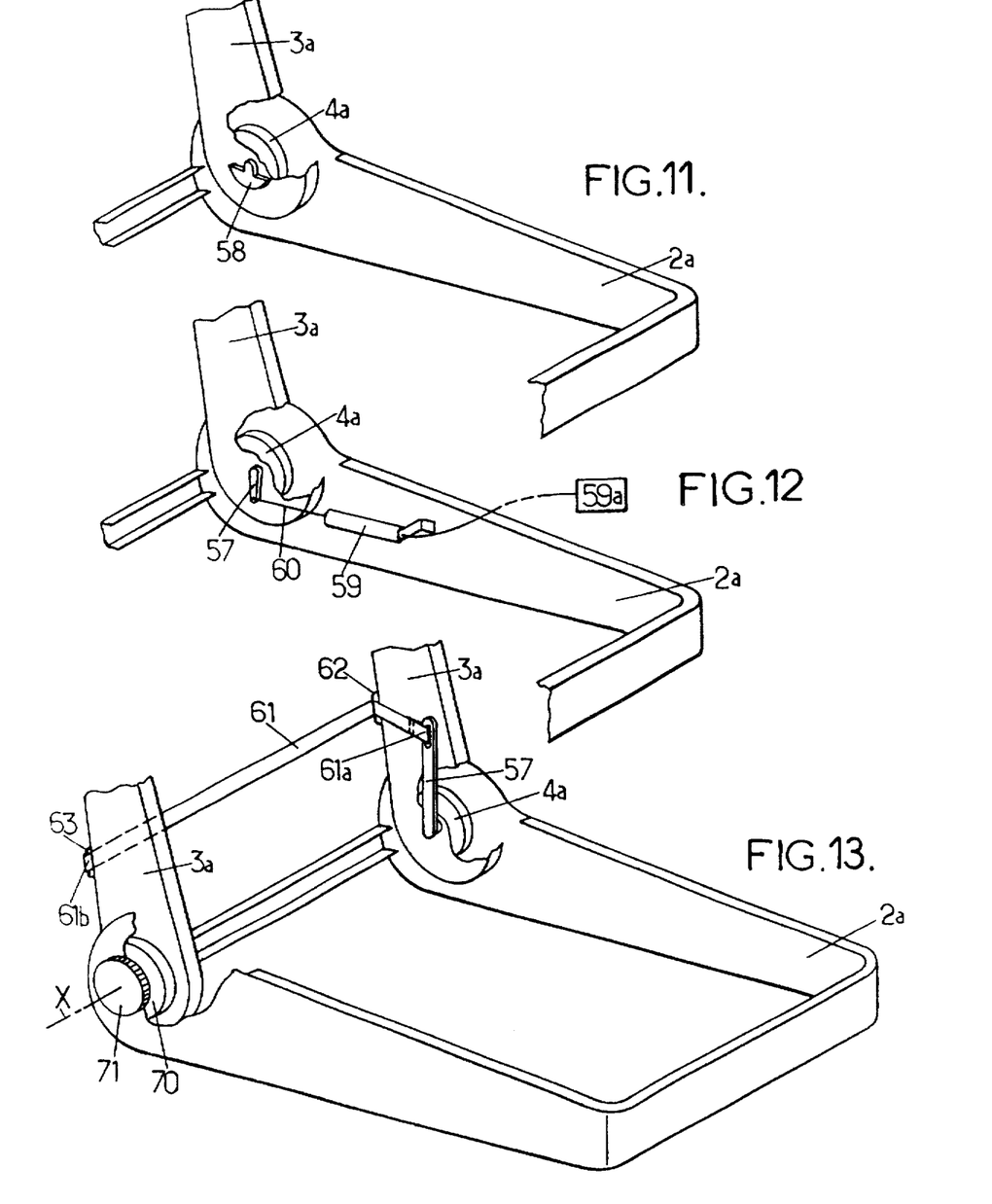
FIGS. 11 to 13 show particular ways in which the locking mechanism of FIGS. 9 and 10 can be applied.

The hinge mechanism may control pivoting of the seat back 3 positively under drive from a manual control knob 71 or possibly under drive from an electric adjustment motor (not shown). One example of such a hinge mechanism is given, inter alia, in document EP-A-0 505 229.

The hinge mechanism 70 may equally well be of the type that serves solely to lock or unlock pivoting of the seat back 3 relative to the seat proper as a function of actuation of a control handle. An example of such a hinge mechanism, is given, inter alia, in document FR-A-2 578 602.

The hinge mechanism 70 is preferably disposed on one side of the seat and the locking mechanism 4a is preferably disposed on the other side of the seat, however, it would naturally be possible for the hinge mechanism 70 and the locking mechanism 4a to be both disposed on the same side of the seat, or to provide two locking mechanisms 4a, one adjacent to the hinge mechanism 70, and another on the opposite side of the seat.

The seat could also include a locking mechanism 4a on one side and a hinge mechanism 4 of the kind described above on the other.

As can be seen in FIGS. 9 and 10, the locking mechanism 4a differs from the above-described hinge mechanism 4 solely by the fact that it does not include the first cam 31, the springs 32, or the control shaft 33, such that the slugs 40 of the locking mechanism are normally kept in their retracted position by the resilient metal wires 53.

The slugs 40 are urged into their engaged position by the second cam 50 in the event of the vehicle being subjected to a front or back impact of sufficient strength.

The cam 50 is controlled by actuator means that may comprise, for example, a fly weight 58 (FIG. 11), a pyrotechnic device 59 (FIG. 12), or a belt 61 extending transversely inside the seat back (FIG. 13), with these various actuator means being the same as those described above for the hinge mechanism 4.

As taught in French patent application No. 95 00206, the contents of which is incorporated in the present application by reference, each slug 40 preferably has two abutment faces 44 extending from the vicinity of the teeth 42 of the slug to a shoulder 45 facing in the opposite direction to said set of teeth of the slug and situated close thereto.

The abutment faces 44 have a high degree of mechanical strength and the guide 11 includes, respectively facing the abutment faces 44, two counter-abutment faces 13 of smaller strength than the abutment faces 44.

When the slug 40 is in its engaged position, the facing abutment faces 44 and counter-abutment faces 13 are in mutual contact over an area that is small enough for the abutment faces 45 of the slug to penetrate into the corresponding counter-abutment faces 13 of the guide when the seat back 3 is subjected to a sufficiently large pivoting torque about the axis of rotation X.

The slugs 40 thus remain locked in their engaged position whatever the violence of the impact to which the vehicle is subject.

The minimum torque for which the abutment faces 44 of the slugs penetrate into the counter-abutment faces 13 can lie, for example, in the range 50 mdaN to 200 mdaN, and possibly in the range 100 mdaN to 200 mdaN.

I claim:

1. A locking mechanism for fitting to a vehicle seat comprising a seat proper and a seat back pivotally mounted relative to the seat proper about a transverse pivot axis, the mechanism comprising:

(a) first and second cheek plates, one for securing to a seat proper and the other for securing to a seat back, which cheek plates are pivotally mounted relative to each other about a pivot axis;

(b) locking means for locking the first and second cheek plates relative to each other; and (c) actuator means responsive at least to one of a predetermined front or back impact to which a vehicle having a vehicle seat fitted with said locking mechanism may be subject, for actuating said locking means to lock the first and second cheek plates relative to each other in the event of said predetermined impact occurring;

said locking means comprising:

(i) a set of teeth secured to the second cheek plate, said set of teeth extending over at least an arc of a circle centered on the pivot axis and being directed radially inwards;

(ii) at least one slug provided with an outwardly-directed set of teeth suitable for co-operating with the set of teeth of the second cheek plate, said slug being guided by a guide secured to the first cheek plate to slide in a radial direction between an engaged position in which the slug co-operates with the set of teeth of the second cheek plate to lock the first and second cheek plates relative to each other, and a retracted position in which the slug does not co-operate with the teeth of the second cheek plate; and (iii) a locking cam which controls sliding of the slug and which is itself controlled by said impact-responsive actuator means, the locking cam normally being in a rest position where it enables the slug to slide towards its retracted position, said impact-responsive actuator means causing the locking cam to be displaced into a locking position in which it places the slug in its engaged position in the event of said predetermined impact occurring.

2. A mechanism according to claim 1, in which, in the absence of said predetermined impact, the locking cam is held in its rest position by resilient means.

3. A mechanism according to claim 2, in which the locking cam is mounted to rotate about the pivot axis, the resilient means which hold said locking cam in its rest position including a resilient metal wire which extends between two ends fixed to said locking cam respectively on either side of the slug, said resilient metal wire having a central portion which bears radially inwards on a projecting portion of the slug, holding said slug in its retracted position so long as the locking cam is in its rest position.

4. A mechanism according to claim 3, in which the central portion of the resilient metal wire includes a projecting portion which projects radially outwards and which is engaged radially against the projecting portion of the slug, lying over a portion of an outline of said projecting portion of the slug.

5. A mechanism according to claim 2, in which the resilient means which hold the locking cam in its rest position include a resilient metal wire which extends between two ends fixed to said locking cam respectively on either side of the projecting portion of the slug, said resilient metal wire having a central portion which bears radially inwards on the projecting portion of the slug, urging said slug towards its retracted position with a force that is lower than the urging applied to said slug under the effect of the resilient means that act on the adjustment cam.

6. A mechanism according to claim 5, in which the central portion of the resilient metal wire includes a projecting portion which projects radially outwards and which is engaged radially against the projecting portion of the slug, lying over a portion of an outline of said projecting portion of the slug.

7. A mechanism according to claim 1, in which the locking cam is mounted to rotate about the pivot axis, said locking cam having first and second camming surfaces suitable for co-operating with the slug in the event of the locking cam being displaced angularly in either direction from its rest position, so as to place said slug in its engaged position.

8. A mechanism according to claim 1, further comprising:
   (iv) an adjustment cam for controlling sliding of the slug, said adjustment cam being held by resilient means in a rest position where it puts the slug in its engaged position; and
   (v) a control member for moving the adjustment cam from its rest position to an actuated position in which it enables the slug to slide towards its retracted position.

9. A mechanism according to claim 7, in which the locking and adjustment cams are mounted to rotate independently of each other about the pivot axis in two adjacent planes, the slug including both a main body situated in the same plane as the adjustment cam and including the outwardly-directed teeth of the slug, and a projecting portion situated in the plane of the locking cam and co-operating with said locking cam.

10. A mechanism according to claim 1, in which the slug has two opposite abutment faces extending from the vicinity of the teeth of said slug to a shoulder disposed facing away from the teeth of the slug and situated close to said teeth, at least the abutment faces of the slug presenting high strength, the guide including two counter-abutment faces respectively disposed facing the two abutment faces and their shoulders and having strength lower than the strength of the abutment faces; and
   in which, when the slug is in its engaged position, the facing abutment and counter-abutment faces are in mutual contact over an area that is small enough for one of the abutment faces then to penetrate into the corresponding counter-abutment face of the guide when one of the cheek plates is subjected to pivoting torque about the axis of rotation exceeding a predetermined minimum torque.

11. A mechanism according to claim 10, in which the predetermined minimum torque lies in the range 50 mdaN and 200 mdaN.

12. A vehicle seat comprising a seat proper and a seat back mounted to pivot relative to the seat proper about a transverse pivot axis, said seat being fitted with a locking mechanism comprising
   (a) first and second cheek plates, one for securing to a seat proper and the other for securing to a seat back, which cheek plates are pivotally mounted relative to each other about a pivot axis;
   (b) locking means for locking the first and second cheek plates relative to each other; and
   (c) actuator means responsive at least to one of a predetermined front or back impact to which a vehicle having said vehicle seat fitted with said locking mechanism may be subject, for actuating said locking means to lock the first and second cheek plates relative to each other in the event of said predetermined impact occurring;
   said locking means comprising:
      (i) a set of teeth secured to the second cheek plate, said set of teeth extending over at least an arc of a circle centered on the pivot axis and being directed radially inwards;
      (ii) at least one slug provided with an outwardly-directed set of teeth suitable for co-operating with the set of teeth of the second cheek plate, said slug being guided by a guide secured to the first cheek plate to slide in a radial direction between an engaged position in which the slug co-operates with the set of teeth of the second cheek plate to lock the first and second cheek plates relative to each other, and a retracted position in which the slug does not co-operate with the teeth of the second cheek plate; and
      (iii) a locking cam which controls sliding of the slug and which is itself controlled by said impact-responsive actuator means, the locking cam normally being in a rest position where it enables the slug to slide towards its retracted position,
   said impact-responsive actuator means causing the locking cam to be displaced into a locking position in which it places the slug in its engaged position in the event of said predetermined impact occurring.

13. A seat according to claim 12, in which the locking cam is mounted to rotate relative to the pivot axis, the means for actuating said locking cam including a fly weight which is connected to said locking cam via a lever arm and which is offset vertically relative to the pivot axis.

14. A seat according to claim 12, in which the means for actuating the locking cam comprise a pyrotechnic device.

15. A seat according to claim 12, in which the means for actuating the locking cam comprise a flexible link extending transversely inside the seat back between a fixed first end and a moving second end connected to said locking cam, said flexible link being constructed and arranged to be subjected to tension in the event of an occupant of the seat being pressed into said seat back, said flexible link then urging the locking cam towards its locking position.

* * * * *